United States Patent
Hong et al.

(10) Patent No.: US 7,305,504 B2
(45) Date of Patent: Dec. 4, 2007

(54) IEEE 1394-ADOPTED HOST DEVICE AND CONTROL METHOD THEREOF

(75) Inventors: Jin-hyuck Hong, Incheon (KR); Tae-deok Kweon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 192 days.

(21) Appl. No.: 11/195,772

(22) Filed: Aug. 3, 2005

(65) Prior Publication Data
US 2006/0031624 A1   Feb. 9, 2006

(30) Foreign Application Priority Data
Aug. 5, 2004   (KR) ............... 10-2004-0061700

(51) Int. Cl.
*G06F 13/00* (2006.01)
(52) U.S. Cl. .................. 710/104; 710/10; 710/16; 710/313
(58) Field of Classification Search .......... 710/8, 710/10, 16, 104, 313
See application file for complete search history.

(56) References Cited

U.S. PATENT DOCUMENTS

| | | | |
|---|---|---|---|
| 5,793,366 A | 8/1998 | Mano et al. | |
| 5,883,621 A | 3/1999 | Iwamura | |
| 6,038,625 A | 3/2000 | Ogina et al. | |
| 6,542,474 B1 * | 4/2003 | Lau ............................ | 370/257 |
| 2001/0038392 A1 * | 11/2001 | Humpleman et al. ....... | 345/733 |

FOREIGN PATENT DOCUMENTS

| | | |
|---|---|---|
| EP | 1 014 701 A2 | 6/2000 |
| EP | 1 271 938 A2 | 1/2003 |
| JP | 2000-259545 A | 9/2000 |
| KR | 2000-0033887 A | 6/2000 |
| KR | 2001-0111181 A | 12/2001 |

OTHER PUBLICATIONS

Maury Wright: "Firewire unleashes the power of digital video", Jul. 3, 1997, XP002345944.

* cited by examiner

*Primary Examiner*—Glenn A. Auve
(74) *Attorney, Agent, or Firm*—Sughrue Mion, PLLC

(57) ABSTRACT

Disclosed are a host device and a control method thereof. The host device includes an IEEE 1394 interface for connecting the slave devices, an input device for inputting display-device-list command for the connected slave devices, a device list manager for sorting slave devices according to the predetermined criterion of the device type by using the device type from the device information of the slave devices and for creating a device list of the slave devices, a display device, and a controller for controlling the device list manager to create the device list when a display-device-list command is inputted and displaying the device list on the display device. Accordingly, a predetermined memory area can be saved, thereby decreasing the unit costs of products.

17 Claims, 6 Drawing Sheets

FIG. 6A

| 1 | STB |
|---|---|
| 2 | DVHS 1 |
| 3 | DVHS 2 |
| 4 | CAMCORDER |

| 1 | STB |
|---|---|
| 2 | DVHS |
| 3 | CAMCORDER |

500

IEEE 1394-ADOPTED HOST DEVICE AND CONTROL METHOD THEREOF

CROSS-REFERENCE TO RELATED APPLICATIONS

This application claims benefit under 35 U.S.C. § 119 from Korean Patent Application No. 2004-61700, filed on Aug. 5, 2004 with the Korean Intellectual Property Office, the entire contents of which are incorporated herein by reference.

BACKGROUND OF THE INVENTION

1. Field of the Invention

The present invention relates to an IEEE 1394-adopted host device and a control method thereof wherein the IEEE stands for the Institute of Electrical and Electronics Engineering.

2. Description of the Related Art

Recently, various kinds of digital devices have been suggested, and the IEEE 1394 standard have drawn attention as a digital interface for constructing a network among these devices. The IEEE 1394 standard particularly has drawn interest because it is recognized as the only specification for the transmission of a HD (High Definition) stream in the field of a digital television.

The IEEE 1394 is a specification of a serial interface which is standardized by the IEEE. The IEEE 1394 was developed as an interface, which connects such devices as a computer peripheral, a video camera, an audio device, a television, a video cassette recorder (VCR), a cable set-top box, an AVHDD (Audio/Video Hard Disk Drive), a DVHS, a video camera, and an MPEG camcorder to a personal computer or a digital television (hereafter, referred as a host device). Three speeds of data transmission are specified, that is, 100 MB, 200 MB, and 400 MB per second. A hot plug-in method is supported to enable direct connections while a host device is operating, and up to 63 slave devices can be connected. Two types of data transmissions, iso-synchronous and asynchronous transmissions, are possible. The iso-synchronous transmission is real-time transmission, so it is suitable for an interface for transferring multi-media information, such as a moving picture or a voice, which requires iso-synchronization, while the asynchronous transmission is a method of dividing and transmitting data so that it can be used for data transmissions between a personal computer and a peripheral like a printer.

On the other hand, in case multiple slave devices are connected to a host device, a user may want to see a list which shows the names of the connected slave devices (hereafter, referred as a device list) through a host device. To provide a device list, however, an additional memory area is conventionally required.

FIG. 1 is a flow chart for explaining a conventional method of displaying a device list of slave devices connected to a host.

First, a user connects one slave device or multiple slave devices to a host device (S10). Then, the host device resets the IEEE 1394 bus (S11). Typically, the reset of an IEEE 1394 bus is performed when a slave device is connected to or disconnected from a host device.

After the reset of the bus, the host device collects device information assigned to each slave device (referred to as device information hereafter) (S12). Examples of device information are the Node ID (Node Identifier), the GUID (Global Unique Identifier), the device type, the model name, and the manufacturer's name. The Node ID changes whenever an IEEE bus is reset, and the GUID is a unique identifier assigned to each slave device.

Then, the host device stores the collected device information, including GUID, in a predefined memory (S13). Generally, an NVRAM (Nonvolatile Random Access Memory) is adopted as a predefined memory.

At this time, device information is stored by applying a predetermined device name to each slave device. For example, STB is applied in case a slave device is a set-top box, and TV is applied to a television, respectively. Then the device information corresponding to the device names is stored.

In case there are at least two slave devices of the same type, a slave device is identified by appending a serial number to the device name. For example, if there are two devices named DVHS, DVHS1 is assigned as one device name and DVHS2 is assigned as the other device name. Hereafter, this process is referred to as a numbering operation.

On the other hand, when a user inputs a display-device-list command into the host device to see a device list of slave devices (S14), the host device retrieves, based on the command, device information stored in a predetermined memory (S15). In this case, device information is retrieved based on the GUID of the connected slave device.

Then, the host device creates and displays a device list using the retrieved device information (S16 and S17).

Examples of the created device list mentioned above are depicted in FIG. 2A and FIG. 2B, respectively. FIG. 2A shows one conventional device list, and FIG. 2B depicts another conventional device list.

As shown in FIG. 2A, STB, DVHS1, DVHS2, and CAMCORDER are displayed in the device list 20. This means that the slave devices connected to the host device are one cable set-top box, two DVHS's, and one MPEG camcorder.

On the other hand, STB, DVHS2, and CAMCORDER are displayed in the device list 30 of FIG. 2B. This means that the slave devices connected to the host device are one cable set-top box, one DVHS, and one MPEG camcorder respectively. In this case, even though there is one DVHS, DVHS2 is displayed in the actual device list. The reason is that the device information of the slave device displays the device name at the time when it was stored in a predetermined memory. That is, the device name at the time when it was stored in a predetermined memory is retrieved through the GUID of a slave device, and the device list is created by use of the retrieved device name. For example, since there were two DVHS's previously, DVHS1 and DVHS2 are displayed in the device list respectively (refer to FIG. 2A), then, in case the slave device registered as DVHS1 is removed from the host device, the slave device stored as DVHS2 still remains as DVHS2 in the storage, so that, when creating a device list hereafter, the slave device stored as DVHS2 is unchanged and displayed as DVHS2. Accordingly, in this case, the device list is displayed inaccurately to a user. That is, such a case confuses a user as to whether the number of DVHS is one or two.

According to a conventional method, a predetermined memory area is required to store device information of slave devices, thereby increasing the unit costs of production.

SUMMARY OF THE INVENTION

The present invention has been developed in order to address the above drawbacks and other problems associated with the conventional arrangement. An aspect of the present invention is to provide a host device and a control method thereof, in which device information is not stored separately in order to create a device list, but a sorted device list of slave devices is provided according to sorting criteria which are predetermined by using at least one of the device type, the manufacturer's name, or the GUID information.

The foregoing and other objects and advantages are substantially realized by providing a host device connected with at least one slave device through the IEEE 1394 bus having a display function, comprising an IEEE 1394 interface for connecting the slave devices, an input device for inputting a display-device-list command for the connected slave devices, a device list manager for sorting slave devices according to the criterion of the device type which is predetermined by using the device type from the device information of the slave devices and for creating a device list of the sorted slave devices, a display device, and a controller for controlling the device list manager to create the device list when a display-device-list command is input and displaying the created device list on the display device.

The host device may further comprise an IEEE 1394 bus driver for collecting device information of the slave devices connected to the IEEE 1394 interface, and the controller, when a display-device-list command is inputted, may control the IEEE 1394 bus driver to collect and provide the device information of the slave devices to the device list manager.

The device list manager, when the slave devices are sorted by a predetermined criterion of device type, may check if there exist at least two devices of the same device type among the sorted slave devices, and, in case there exist at least two slave devices as a result of the check, sorts the slave devices of the same device type according to the predetermined sorting criterion of the same device type and updates the device list.

The sorting criterion of the same device type is preferably, but not necessarily, a criterion for sorting at least two slave devices of the same device type in alphabetical order of the manufacturer's name of the device information.

The sorting criterion of the same device type is preferably, but not necessarily, a criterion for sorting by the manufacturer's name of the device information, with a specific manufacturer's name as the foremost criterion.

The device list manager, when devices of the same type are sorted by the criterion of the same device type, may check if there exist at least two slave devices of the same manufacturer among the sorted devices of the same device type, and, in case there exist at least two slave devices as a result of the check, sorts the slave devices according to the predetermined sorting criterion of the same device type of the same manufacturer and updates the device list.

The sorting criterion of the same device type of the same manufacturer is preferably, but not necessarily, a criterion for sorting at least two slave devices of the same device type of the same manufacturer in order of GUID of the device information.

After at least two slave devices of the same manufacturer are sorted by the sorting criterion of the same device type of the same manufacturer, it is preferable, but not necessary, to add serial numbers to the at least two sorted slave devices of the same manufacturer in order of the sorted result and update the device list.

The foregoing and other objects and advantages are substantially realized by providing a control method for a host device connected with at least one slave device through the IEEE 1394 bus and having a display function, comprising steps of collecting device information of the slave devices when a display-device-list command for the connected slave devices is input, sorting the slave devices according to the predetermined sorting criterion of the device type by using the device type from the device information of the collected slave devices, creating a device list of the sorted slave devices, and displaying the device list.

Further, the foregoing and other objects and advantages are substantially realized by providing a control method for a host device connected with at least one slave device through the IEEE 1394 bus and having a display function, comprising steps of collecting device information of the slave devices when a display-device-list command for the connected slave devices is input, sorting the slave devices according to the predetermined sorting criteria by using at least one of the device type, the manufacturer's name, or the GUID from the device information of the collected slave devices, creating a device list of the sorted slave devices, and displaying the device list.

Accordingly, a predetermined memory area can be saved so that the unit costs of production can be reduced.

BRIEF DESCRIPTION OF THE DRAWINGS

Further aspects of the invention can be more fully understood from the following detailed description taken in conjunction with the accompanying drawings, in which:

FIG. 6A is a view for showing one device list according to an exemplary embodiment of the present invention; and FIG. 6B is a view for showing another device list according to another exemplary embodiment of the present invention.

DESCRIPTION OF EXEMPLARY EMBODIMENTS

Hereafter, exemplary embodiments of the present invention will be explained with reference to the accompanying drawings. In explaining the invention, detailed explanation of the functions or structures of related disclosures will be omitted when providing such explanations would obscure the scope and spirit of the invention.

While the invention will be disclosed with reference to one embodiment of a digital television as a host device, the disclosure is illustrative of the invention and is not to be construed as limiting the invention.

Figure 3:
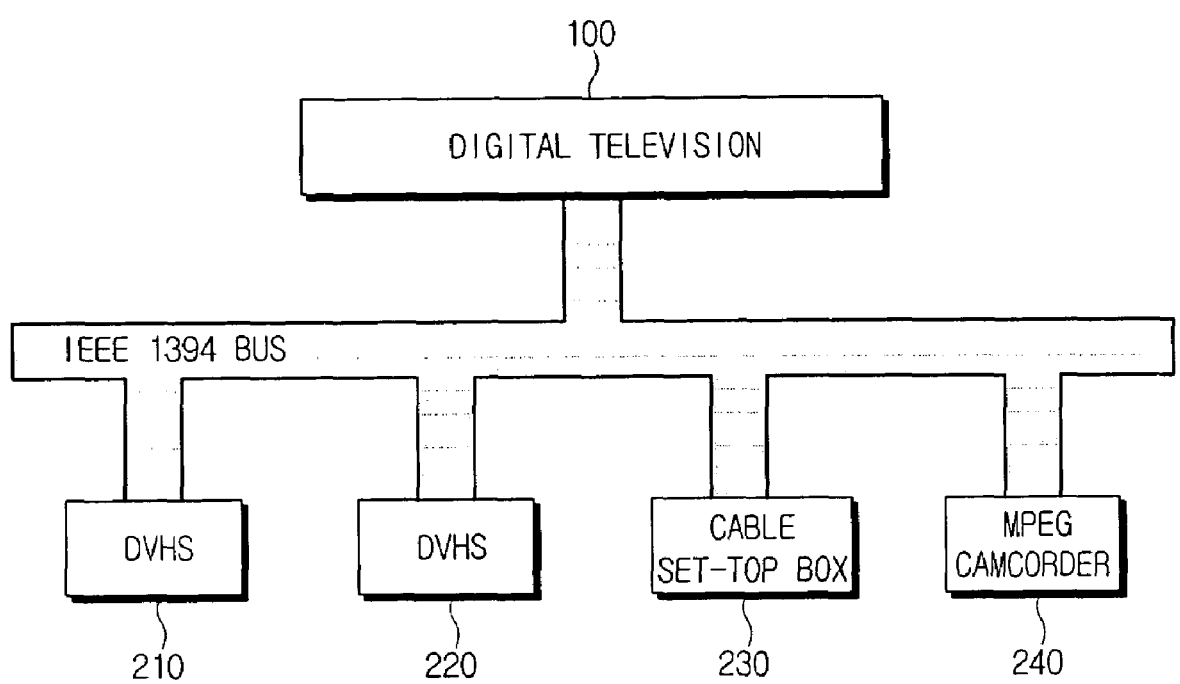
FIG. 3 is a view for schematically showing a digital television and various slave devices connected thereto according to an exemplary embodiment of the present invention.

FIG. 3 is a view for schematically showing a digital television and various slave devices connected thereto according to an exemplary embodiment of the invention.

Referring to FIG. 3, two DVHS's 210 and 220, one cable set-top box 230, and one MPEG camcorder 240 are shown as various slave devices. The digital television 100 as a host device is connected with various slave devices 210, 220, 230 and 240 through the IEEE 1394 bus. When a display-device-list command is inputted from the digital television 100 according to the present embodiment, device information of the connected various slave devices 210, 220, 230 and 240 is collected, and the device name assigned to each slave device according to the collected device information is sorted by the predetermined sorting criteria and displayed as a device list on the digital television 100.

Figure 4:
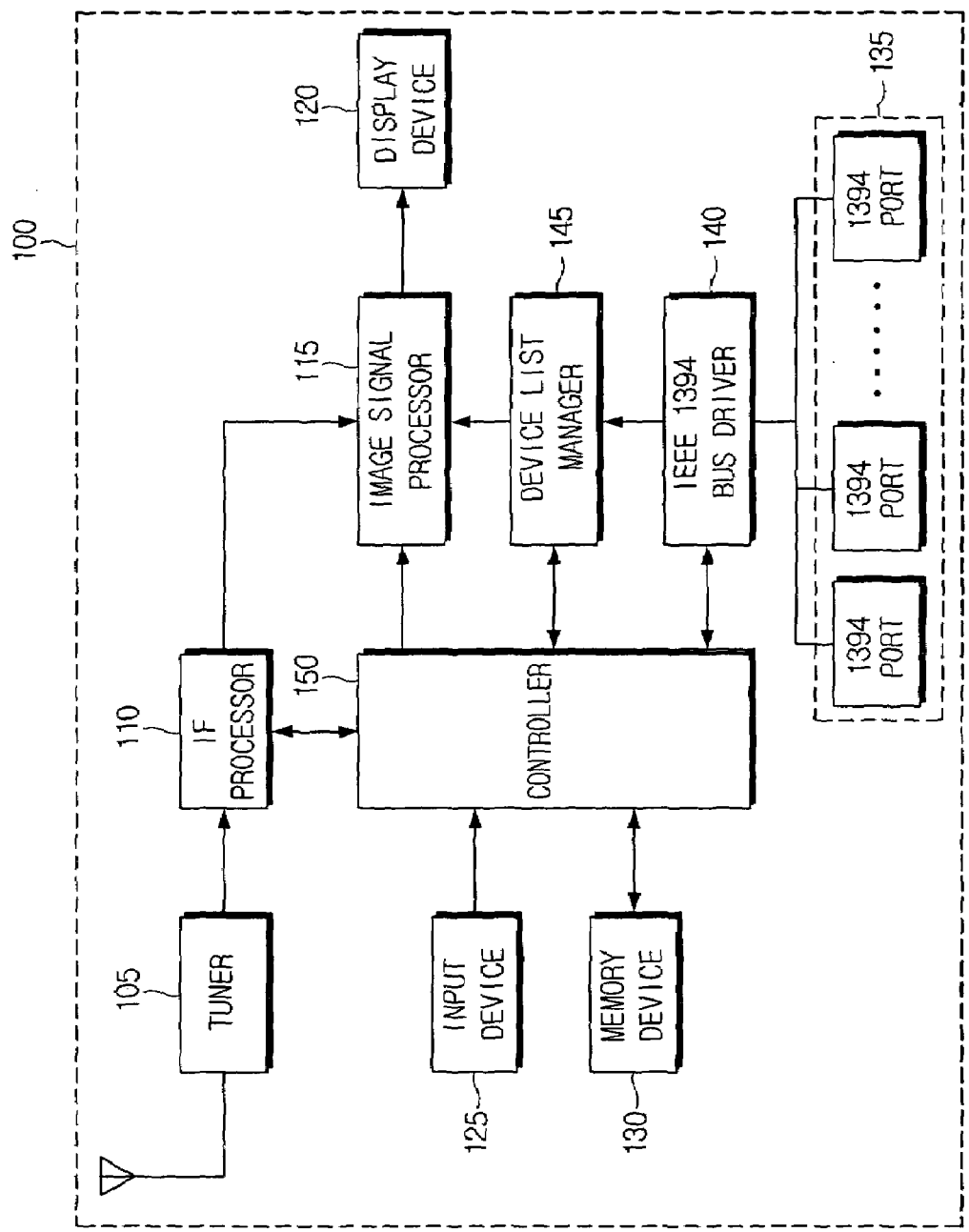
FIG. 4 is an internal block diagram of a digital television according to an exemplary embodiment of the present invention.

FIG. 4 is an internal block diagram of a digital television according to an embodiment of the present invention.

Referring to FIG. 3 and FIG. 4, the digital television 100 includes a tuner 105, an IF processor 110, an image signal processor 115, a display device 120, an input device 125, a memory device 130, an IEEE 1394 interface (hereafter, referred to as 1394 interface) 135, an IEEE 1394 bus driver (hereafter, referred to as 1394 driver) 140, a device list manager 145, and a controller 150.

The tuner 105 performs a channel selection operation for a predetermined channel from multiple channels received through an antenna, under the control of a controller 150 to be explained below. The IF processor 110 amplifies the broadcast signal of the channel selected by the tuner 105 to an IF signal (intermediate frequency signal), and converts the amplified IF signal into a composite video base-band signal (CVBS). The image signal processor 115 demodulates, detects, and processes the CVBS signal as a signal for display, and outputs the resulting signal. In other words, the image signal processor 115 separates the CBVS into a color signal and a luminance signal, combines the separated signals to restore an RGB image, and provides the image to the display device 120.

The image signal output from the image signal processor 115 is provided to viewers as an image through the display device 120. The display device 120 can be implemented by using various image implementation elements such as a CRT (Cathode Ray Tube), an LCD (Liquid Crystal Display), and a PDP (Plasma Display Panel). According to the present embodiment, when a display-device-list command is inputted through the input device 125, the device list created by the device list manager 145 is displayed on the display device 120 under the control of the controller 150.

The input device 125 is a user interface sending to the controller 150 a command for setting or processing functions supported by the digital television 100. To perform this function, the input device 125 has control keys (not shown) such as multiple numeric keys, arrow keys, confirmation keys, and the like. A control panel (not shown) located on the main body of the digital television 100, or a remote controller (not shown) can be used as the input device 125. According to the present embodiment, the display-device-list command is inputted through the input device 125. The display-device-list command is a request command for creating and displaying on the display device 120 a list of the device names of the slave devices connected to the host device.

The memory device 130 stores a control program, various application programs, and data necessary for implementing the functions of the digital television 100, and temporarily stores the data created during the control and image process processing. According to the present embodiment, sorting criteria are stored in the memory device 130. Here, sorting criteria are the information applied when a device list of various slave devices connected to the digital television 100 is created, and is information about the method of sorting slave devices. A sorting criterion of device type, a sorting criterion of the same device type, and a sorting criterion of the same device type of the same manufacturer can be taken as examples of sorting criteria. The sorting criterion of device type is a criterion for sorting devices in predetermined order; a sorting criterion of the same device type is a criterion that is applied when there exist at least two devices of the same device type; and a sorting criterion of the same device type of the same manufacturer is a criterion that is applied when there exist at least two devices of the same manufacturer.

Diverse sorting methods by a sorting criterion can be proposed. However, determining the order of device type, sorting in alphabetical order of the manufacturer in case of the same device type, and sorting in GUID order in case of the device of the same manufacturer can be presented as desirable sorting methods.

The 1394 interface 135 serves as an interface with various slave devices 210, 220, 230, and 240 through the IEEE 1394 bus, and has multiple 1394 ports for this purpose. Accordingly, multiple 1394 ports are connected with various slave devices through IEEE 1394 cables.

The 1394 driver 140 operates and controls the 1394 interface 135, and controls the IEEE 1394 bus through the 1394 interface 135. Therefore, the 1394 driver 140 resets the IEEE 1394 bus, when various slave devices are connected to or disconnected from the digital television 100. In addition, the 1394 driver 140 collects device information of various slave devices 210, 220, 230, and 240 connected to the 1394 interface 135 under the control of the controller 150. On the other hand, the 1394 driver 140 provides the device list manager 145 with the collected device information of various slave devices 210, 220, 230, and 240.

The device list manager 145 receives from the 1394 driver 140 the device information of various slave devices 210, 220, 230, and 240 currently connected to the 1394 interface. Also, the device list manager 145 creates a device list based on the provided device information. In this case, the device list is created as the sorting criteria stored in the memory device 130 are applied. To do so, the sorting criteria are retrieved from the memory device 130 and provided to device list manager 145.

The controller 150 controls general operations of the digital television 100 according to the signal generated from the input device 125 by the key input or the key selection of a user, and the control program stored in the memory device 130.

Consistent with the present invention, the controller 150, when a display-device-list command is inputted from the input device 125, controls the 1394 driver 140 to collect device information of the slave devices, and retrieve and send the sorting criteria from the memory device 130 to the device list manager 145.

Figure 5:
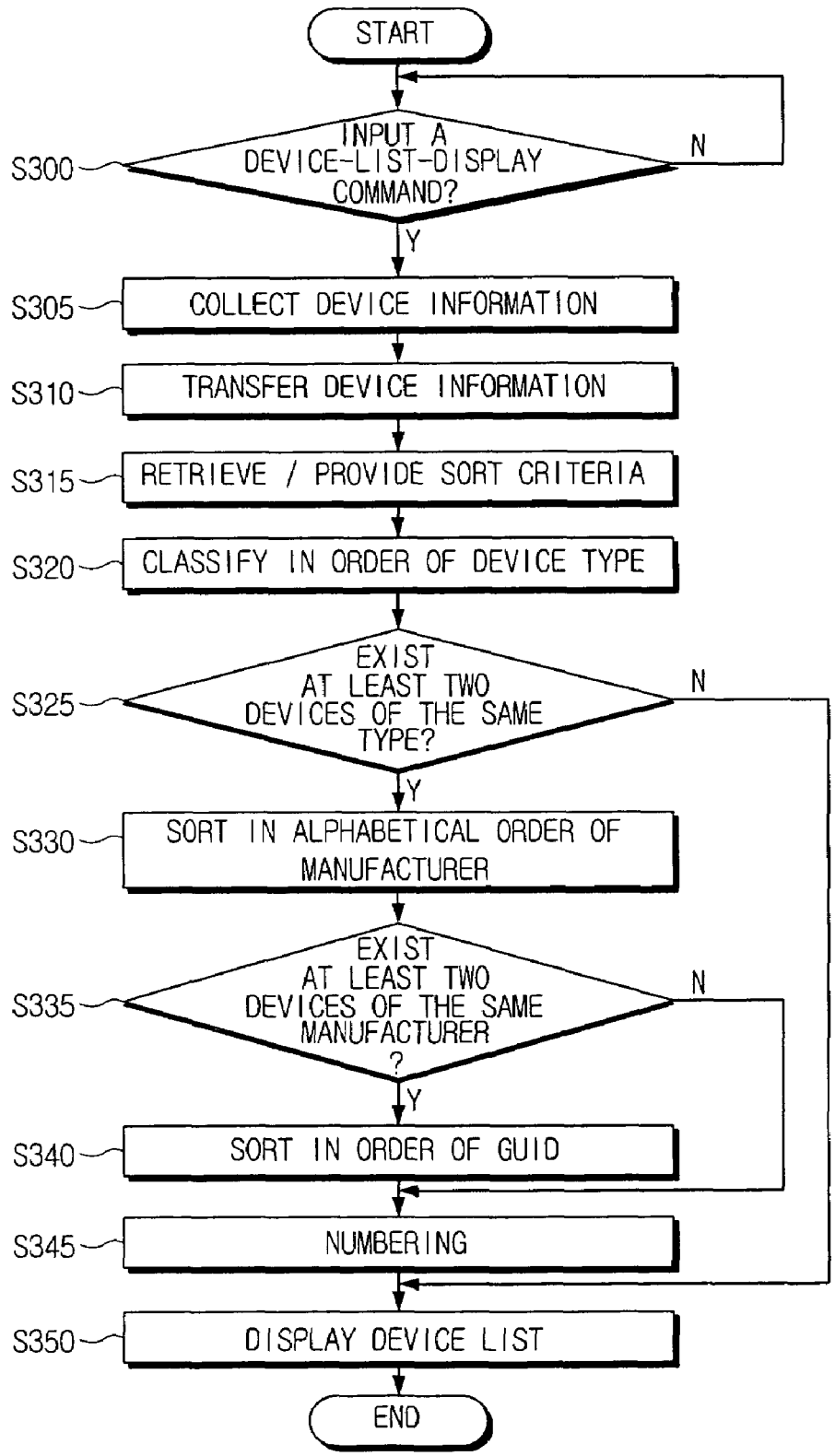
FIG. 5 is a flow chart for explaining a method of controlling a digital television according to an exemplary embodiment of the present invention.

FIG. 5 is a flow chart for explaining a method of controlling a digital television consistent with the present invention.

Hereafter, referring to FIG. 3 to FIG. 5, a method of displaying a device list according to the present invention is explained.

First, the display-device-list command is inputted through the input device 125 by a user (S300). Then, the 1394 driver 140 collects the device information of various slave devices 210, 220, 230, and 240 connected to the 1394 interface 135 (S305). According to the present invention, a device type, a GUID, and a manufacturer can be presented as examples of device information.

Then, the collected device information is transferred to the device list manager 145 (S310).

Then, sorting criteria are retrieved from the memory device 130 and provided to the device list manager 145 under the control of the controller 150 (S315). In the present embodiment, a sorting criterion of device type, a sorting criterion of the same device type, and a sorting criterion of the same device type of the same manufacturer are presented as sorting criteria.

Then, the device list manager 145 sorts the device information on the basis of the provided sorting criteria, which will be explained in detail as follows.

First of all, the device list manager 145 classifies slave devices 210, 220, 230, and 240 in order of the device type on the basis of the sorting criterion of the device type (S320). For example, television→cable set-top box→AVHDD→DVHS→MPEG camcorder can be taken as an example of the order of slave devices 210, 220, 230, and 240.

Further, the device list manager 145 checks whether there exist at least two devices of the same device type as a classification result of the step S320 (S325).

If the result of the check of the step S325 shows that there does not exist at least two devices of the same type, i.e. all the connected devices are different in device type, the device list is created by the device list manager 145 in order of the classified device type in the step S320, and displayed on the display device 120.

On the other hand, if the result of the check of the step S325 shows that there exist at least two devices of the same device type, devices of the same type are sorted on the basis of the predetermined sorting criterion of the same device type (S330). In the present embodiment, the method of sorting in alphabetical order of the manufacturer name is taken as an example. However, the scope of the present invention is not restricted to the aforementioned disclosure. In other exemplary embodiments, sorting may be done by specific character order, or by having a specific manufacturer's name as the foremost sorting criterion, or by other sorting criteria.

Further, the device list manager 145 checks whether there exist at least two devices of the same manufacturer as the result of the sort in the step S330 (S335). If the result of the check of the step S335 shows that there exist at least two devices of the same manufacturer, devices of the same manufacturer are sorted by the predetermined sorting criterion of the same device type of the same manufacturer (S340). In the present embodiment, the method of sorting in GUID order is taken as an example. However, the scope of the present invention is not restricted by the aforementioned disclosure.

Further, in case there does not exist at least two devices of the same manufacturer in the step S335 and the devices are sorted in GUID order in step S340, the numbering process is performed to add a serial number to each device of the same type (S345). Also, the device list manager 145 creates a device list on the basis of the sorting of slave devices as described above, and the controller 150 processes the device list to be displayed. That is, the device list of the names of slave devices sorted from the step S320 to S345 is displayed on the display device 120 (S350).

Examples of the device list created through the processes described above are shown in FIG. 6A and FIG. 6B.

As shown in the device list 400 of FIG. 6A, STB, DVHS1, DVHS2, and CAMCORDER are displayed. This means that slave devices connected to the host device are one set-top box, two DVHS's, and one MPEG camcorder.

On the other hand, in the device list 500 of FIG. 6B, STB, DVHS, and CAMCORDER are displayed. This means that slave devices connected to the host device are one set-top box, one DVHS, and one MPEG camcorder.

Figure 1:
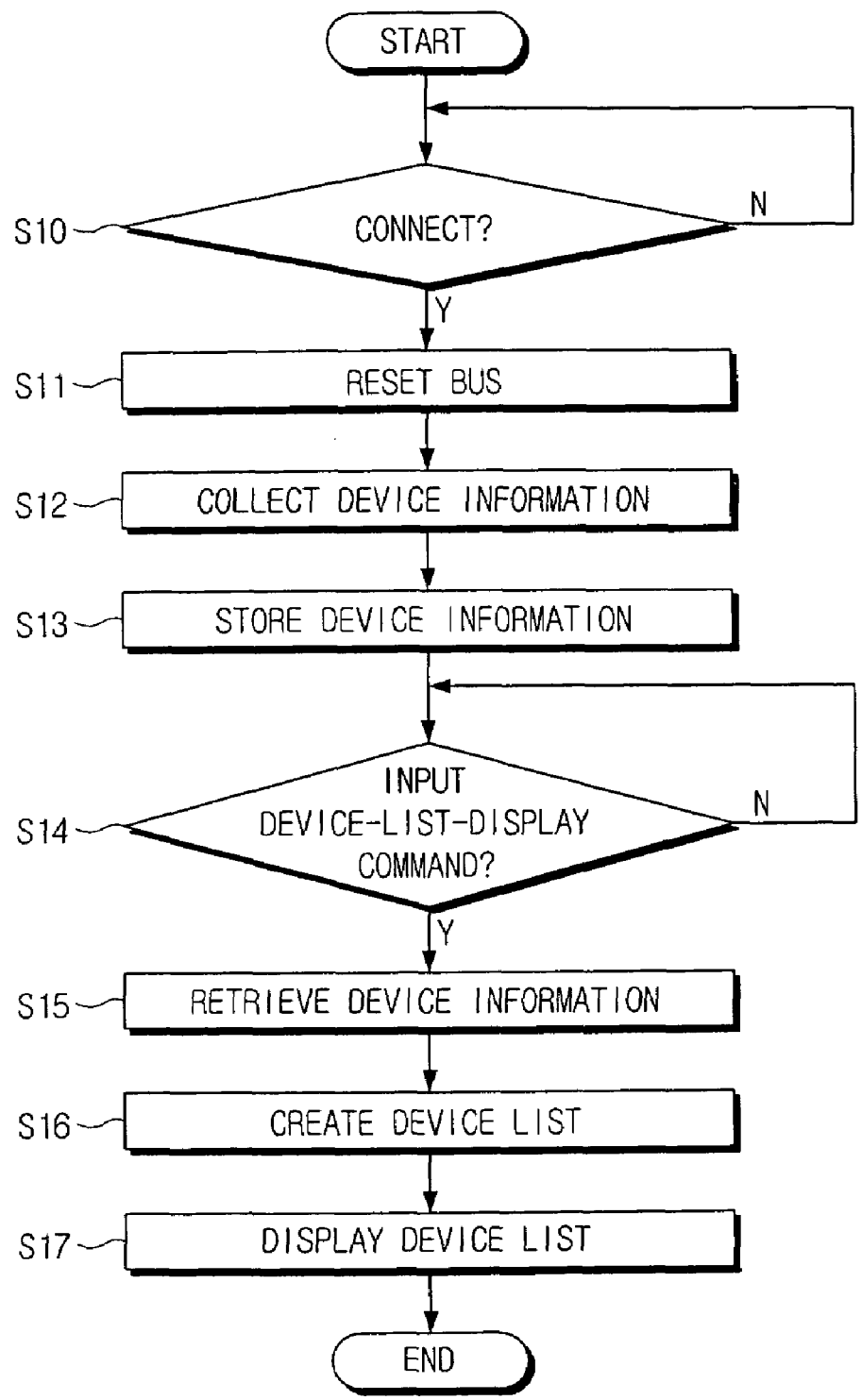
FIG. 1 is a flow chart explaining a conventional method of displaying a device list of slave devices connected a host.
Figure 2A:
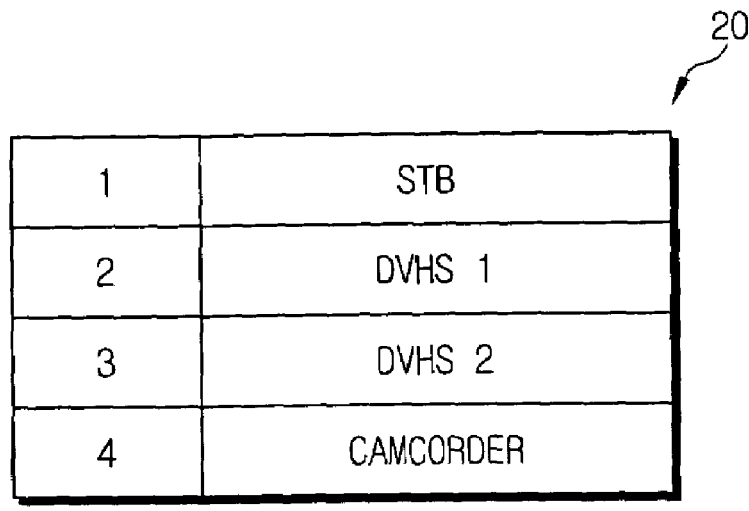
FIG. 2A is a view for showing one conventional device list.
Figure 2B:
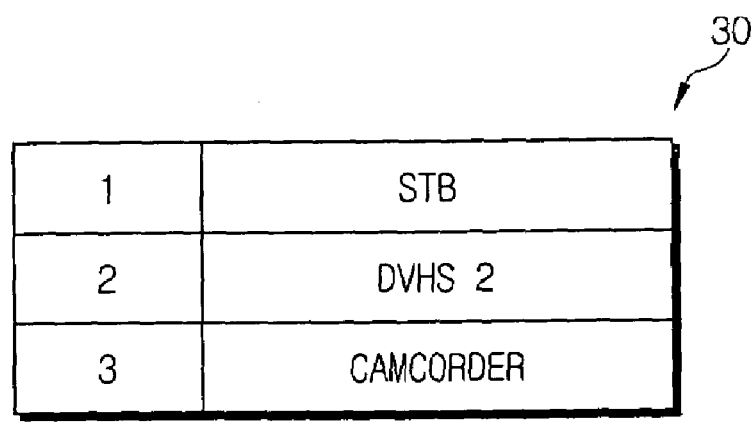
FIG. 2B is a view for showing another conventional device list.

As described previously, the same device list 400 as that of FIG. 2A is depicted in FIG. 6A. However, a device list 500 different from that of FIG. 2B is shown in FIG. 6B. Conventionally, since the name of each slave device is assigned in a fixed way when the device information of slave devices is stored in a predefined memory, the device list 30 is displayed as shown in FIG. 2B. However, in the present invention, since the name of each slave device is assigned flexibly when a display-device-list command is inputted by a user, the device list 30 is displayed as shown in FIG. 6B.

In the above descriptions, only the device type, the same device type, and the same manufacturer are taken as examples of the order of sorting criteria. However, the present invention is not restricted to that embodiment, but other embodiments are possible. An example of another embodiment is one which creates a device list by changing the order to which the sorting criteria is applied.

As described above, conventionally, a predefined memory area is required to store device information of slave devices, thereby increasing the unit costs of production. The host device and the control method thereof according to the present invention does not require a predefined memory area to store device information of slave devices, so a small amount of memory is used for the products, thereby decreasing the unit costs of products. Also, according to the present invention, even when the bus is reset by the connection to or disconnection from one or more slave devices, the order of slave devices is sorted consistently. In addition, the names of slave devices are changed flexibly by current condition, so users are not confused.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A host device connected with at least one slave device through an IEEE 1394 bus, comprising:
    an IEEE 1394 interface which connects the at least one slave devices;
    an input device which inputs a display-device-list command for the at least one slave devices;
    a device list manager which sorts the at least one slave devices according to a predetermined criterion of a device type by using the device type from device information of the at least one slave devices and creates a device list of the sorted at least one slave devices;
    a display device;
    a controller which controls the device list manager to create the device list when the display-device-list command is inputted, and to control display of the created device list on the display device; and
    an IEEE 1394 bus driver which collects the device information of the at least one slave device connected to the IEEE 1394 interface, wherein the controller, when the display-device-list command is inputted, controls the IEEE 1394 bus driver to collect the device information of the slave device and transfers the collected device information to the device list manager.

2. The host device as claimed in claim 1, wherein the device list manager, when the at least one slave devices are sorted by the predetermined criterion of the device type, checks if there exist at least two slave devices of a same device type among the sorted at least one slave devices, and, in case there exist the at least two slave devices as a result of the check, sorts the at least two slave devices of the same device type according to the predetermined sorting criterion of the same device type, and updates the device list.

3. The host device as claimed in claim 2, wherein the sorting criterion of the same device type is a criterion for sorting the at least two slave devices of the same device type in alphabetical order of a manufacturer's name of the device information.

4. The host device as claimed in claim 2, wherein the sorting criterion of the same device type is a criterion for sorting by a manufacturer's name of the device information, using a specific manufacturer's name as a foremost criterion.

5. The host device as claimed in claim 2, wherein the device list manager, when the at least two slave devices of the same type are sorted by the criterion of the same device type, checks if there exist at least two slave devices of a same manufacturer among the sorted the at least two slave devices of the same device type, and, in case there exist the at least two slave devices as a result of the check, sorts the at least two slave devices of the same manufacturer according to the predetermined sorting criterion of the same device type of the same manufacturer, and updates the device list.

6. The host device as claimed in claim 5, wherein the sorting criterion of the same device type of the same manufacturer is a criterion for sorting the at least two slave devices of the same device type of the same manufacturer in order of Global Unique Identifier (GUID) of the device information.

7. The host device as claimed in claim 5, wherein after the at least two slave devices of the same manufacturer are sorted by the sorting criterion of the same device type of the same manufacturer, serial numbers are added to the sorted at least two slave devices of the same manufacturer in order of the sorted result and the device list is updated.

8. A controlling method for a host device connected with at least one slave device through an IEEE 1394 bus and having a display device, comprising:
    collecting device information of the at least one slave devices when a display-device-list command for the connected at least one slave devices is inputted;
    transferring the collected device information of the at least one slave device to a device list manager;
    sorting the at least one slave devices according to a predetermined criterion of a device type by using the device type from the transferring the collected device information of the at least one slave devices;
    creating a device list of the sorted at least one slave devices; and displaying the created device list.

9. The controlling method as claimed in claim 8, further comprising:
    checking if there exist at least two slave devices of a same device type among the sorted at least one slave devices; and
    sorting the at least two slave devices according to the predetermined sorting criterion of the same device type, in case it is determined that there exist the at least two devices of the same device type as a result of the checking.

10. The control method as claimed in claim 9, wherein the sorting criterion of the same device type is a criterion for sorting the at least two slave devices of the same device type in alphabetical order of a manufacturer's name of the device information.

11. The control method as claimed in claim 9, wherein the sorting criterion of the same device type is a criterion for sorting the at least two slave devices of the same device type by a manufacturer's name of the device information, using a specific manufacturer's name as a foremost criterion.

12. The control method as claimed in claim 9, further comprises:
    checking if there exist at least two slave devices of a same manufacturer among the sorted at least two slave devices of the same type; and
    sorting the at least two slave devices of the same manufacturer according to the predetermined sorting criterion of the same device type of the same manufacturer and updating the device list in case it is determined that there exist the at least two devices of the same manufacturer as a result of the checking.

13. The control method as claimed in claim 12, wherein the sorting criterion of the same device type of the same manufacturer is a criterion for sorting the at least two devices of the same device type of the same manufacturer in order of a GUID (Global Unique Identifier) which is one of the device information.

14. The control method claimed in claim 12, wherein, after the at least two devices of the same manufacturer are sorted by the sorting criterion of the same device type of the same manufacturer, serial numbers are added to the at least two sorted devices of the same manufacturer in order of the sorted result and the device list is updated.

15. A control method for a host device connected with at least one slave device through an IEEE 1394 bus and having a display device, comprising:
    collecting device information of the at least one slave devices when a display-device-list command for the connected at least one slave devices is inputted;
    transferring the collected device information of the at least one slave device to a device list manager;
    sorting the at least one slave devices according to a predetermined criterion by using at least one of a device type, a manufacturer's name, or a GUID from the transferring the collected device information of the at least one slave devices;
    creating a device list of the sorted at least one slave devices; and
    displaying the created device list.

16. The control method as claimed in claim 15, wherein, when the manufacturer's name in the step of sorting the at least one slave devices is used, the sorting criterion is a criterion for sorting in alphabetical order of the manufacturer's name.

17. The control method as claimed in claim 15, wherein, when the manufacturer's name in the step of sorting the at least one slave devices is used, the sorting criterion is a criterion for sorting by the manufacturer's name, using a specific manufacturer's name as a foremost criterion.

* * * * *